(12) United States Patent
Boegli

(10) Patent No.: US 12,427,403 B2
(45) Date of Patent: Sep. 30, 2025

(54) MOBILE GAME CONTROLLER AND METHOD FOR CONNECTING TO A WIRELESS AUDIO DEVICE

(71) Applicant: Backbone Labs, Inc., Vancouver, WA (US)

(72) Inventor: Samuel Boegli, Beaverton, OR (US)

(73) Assignee: Backbone Labs, Inc., Vancouver, WA (US)

( * ) Notice: Subject to any disclaimer, the term of this patent is extended or adjusted under 35 U.S.C. 154(b) by 248 days.

(21) Appl. No.: 18/226,892

(22) Filed: Jul. 27, 2023

(65) Prior Publication Data

US 2025/0032901 A1    Jan. 30, 2025

(51) Int. Cl.
  *A63F 13/235*    (2014.01)
  *A63F 13/54*    (2014.01)
  *A63F 13/92*    (2014.01)
  *H04W 12/55*    (2021.01)

(52) U.S. Cl.
  CPC ............ *A63F 13/235* (2014.09); *A63F 13/54* (2014.09); *A63F 13/92* (2014.09); *H04W 12/55* (2021.01)

(58) Field of Classification Search
  CPC ........ A63F 13/235; A63F 13/54; A63F 13/92; H04W 12/55
  See application file for complete search history.

(56) References Cited

U.S. PATENT DOCUMENTS

| | | |
|---|---|---|
| 3,536,908 A | 10/1970 | Oster |
| 4,636,593 A | 1/1987 | Novak |
| 6,238,289 B1 | 5/2001 | Sobota |
| 6,640,268 B1 | 10/2003 | Kumar |
| 6,684,062 B1 | 1/2004 | Gosior |
| 6,736,724 B1 | 5/2004 | Erikawa |
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Ke Xiao
(74) *Attorney, Agent, or Firm* — Crowell & Moring LLP

(57) ABSTRACT

A game controller can provide input to a video game (e.g., to control an object or character in the video game) and, optionally, to interact with a graphical user interface (e.g., to select the video game and/or perform other functions). The game controller can be connected with a mobile computing device, such as a mobile phone, and the game can be played locally on the mobile computing device or remotely via the mobile computing device. In one embodiment discussed herein, a platform-customized mobile game controller is provided. In another embodiment discussed herein, a mobile game controller and method are provided for connecting to a wireless audio device.

20 Claims, 8 Drawing Sheets

(56) References Cited

U.S. PATENT DOCUMENTS

| | | |
|---|---|---|
| 8,760,394 B2 | 6/2014 | Chiang |
| 8,822,851 B2 | 9/2014 | Walker |
| 9,053,243 B2 | 6/2015 | Townsend |
| 9,295,915 B2 | 3/2016 | Bruno |
| 9,677,740 B2 | 6/2017 | Steiner |
| 9,848,324 B1 | 12/2017 | Abene |
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,391,393 B2 | 8/2019 | Townley |
| 10,409,449 B2 | 9/2019 | Takikawa |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,751,612 B1 | 8/2020 | Urbanus |
| 10,868,436 B1 | 12/2020 | Chen |
| 10,893,125 B2 | 1/2021 | Ma |
| 11,000,759 B2 | 5/2021 | Palmer et al. |
| 11,027,191 B2 | 6/2021 | Oh |
| 11,045,723 B1 | 6/2021 | Lee |
| 11,090,557 B2 | 8/2021 | Downs et al. |
| 11,105,969 B2 | 8/2021 | Sasagawa |
| 11,167,209 B2 | 11/2021 | Lu |
| 11,343,354 B2 | 5/2022 | Parekh |
| 11,389,721 B2 | 7/2022 | Khaira et al. |
| 11,395,961 B2 | 7/2022 | Chung |
| 11,528,363 B2 | 12/2022 | Bohannon |
| 11,528,987 B1 | 12/2022 | Girault |
| 11,662,855 B1 | 5/2023 | Sorensen et al. |
| 11,707,670 B2 | 7/2023 | Khaira et al. |
| 11,819,756 B2 | 11/2023 | Lu |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,064,699 B2 | 8/2024 | Miura |
| 12,070,678 B2 | 8/2024 | Maker |
| 12,074,946 B2 | 8/2024 | Wei |
| 12,115,443 B2 | 10/2024 | Khaira et al. |
| 12,121,800 B2 | 10/2024 | Maker |
| 12,145,052 B2 | 11/2024 | Khaira et al. |
| 12,145,053 B2 | 11/2024 | Khaira et al. |
| 12,194,374 B2 | 1/2025 | Khaira |
| 12,263,400 B2 | 4/2025 | Lake et al. |
| 12,268,956 B2 | 4/2025 | Khaira |
| 12,285,676 B2 | 4/2025 | Maker |
| 12,324,983 B2 | 6/2025 | O'Connor |
| 2001/0027130 A1 | 10/2001 | Namba |
| 2002/0173354 A1 | 11/2002 | Winans |
| 2004/0225502 A1 | 11/2004 | Bear |
| 2005/0017953 A1 | 1/2005 | Pekka |
| 2005/0172045 A1 | 8/2005 | Bermudez et al. |
| 2005/0221894 A1 | 10/2005 | Lum |
| 2005/0243585 A1 | 11/2005 | Marchant |
| 2005/0247550 A1 | 11/2005 | Hamada |
| 2006/0132458 A1 | 6/2006 | Garfio |
| 2006/0152628 A1 | 7/2006 | Park |
| 2006/0234794 A1 | 10/2006 | Baseflug et al. |
| 2006/0236002 A1 | 10/2006 | Valenci |
| 2007/0010328 A1 | 1/2007 | Yokota |
| 2007/0091633 A1 | 4/2007 | Harrity |
| 2007/0152965 A1 | 7/2007 | Krzyzanowski |
| 2007/0155511 A1 | 7/2007 | Grundstedt |
| 2007/0233291 A1 | 10/2007 | Herde |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1 | 1/2011 | Penman et al. |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2012/0284302 A1 | 11/2012 | Takagi |
| 2013/0033829 A1 | 2/2013 | Furubo et al. |
| 2013/0077346 A1 | 3/2013 | Chen |
| 2013/0162680 A1 | 6/2013 | Perry |
| 2013/0191625 A1 | 7/2013 | Mullens et al. |
| 2013/0225288 A1 | 8/2013 | Levin et al. |
| 2013/0237322 A1 | 9/2013 | Sobel |
| 2013/0298208 A1* | 11/2013 | Ayed ............... G06F 21/43 375/259 |
| 2014/0018173 A1 | 1/2014 | Urhman |
| 2014/0024392 A1 | 1/2014 | Su |
| 2014/0109133 A1 | 4/2014 | Kitazato |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0365214 A1 | 12/2014 | Bayley |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1 | 10/2015 | Falc et al. |
| 2015/0281422 A1 | 10/2015 | Kessler et al. |
| 2016/0062489 A1 | 3/2016 | Li |
| 2016/0132114 A1 | 5/2016 | Rihn |
| 2016/0180811 A1 | 6/2016 | Colenbrander |
| 2016/0234264 A1 | 8/2016 | Coffman |
| 2016/0313912 A1 | 10/2016 | Keam |
| 2016/0317919 A1 | 11/2016 | Gassoway et al. |
| 2016/0329533 A1 | 11/2016 | Tajima |
| 2017/0056762 A1 | 3/2017 | Gafni |
| 2017/0072307 A1 | 3/2017 | Perry |
| 2017/0142201 A1* | 5/2017 | Holmes ............... A63F 13/355 |
| 2017/0173461 A1 | 6/2017 | Pack |
| 2017/0205881 A1 | 7/2017 | Yamashita |
| 2017/0239468 A1 | 8/2017 | Lemke |
| 2018/0004250 A1 | 1/2018 | Barnett et al. |
| 2018/0056176 A1 | 3/2018 | Sakamoto |
| 2018/0070389 A1 | 3/2018 | Morgan |
| 2018/0097860 A1 | 4/2018 | Daly |
| 2018/0121655 A1 | 5/2018 | Abene |
| 2018/0133594 A1 | 5/2018 | Guo |
| 2018/0250588 A1 | 9/2018 | Winick |
| 2018/0345136 A1 | 12/2018 | Schmitz et al. |
| 2018/0345139 A1 | 12/2018 | Smith |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0230400 A1 | 7/2019 | Van Os |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0126984 A1 | 4/2021 | Parekh |
| 2021/0154584 A1 | 5/2021 | O'Connor et al. |
| 2021/0197082 A1 | 7/2021 | Seibert et al. |
| 2021/0200501 A1 | 7/2021 | Stankoulov |
| 2021/0205699 A1 | 7/2021 | Chung |
| 2021/0275907 A1 | 9/2021 | Khaira et al. |
| 2021/0291062 A1 | 9/2021 | Tulewicz |
| 2021/0299553 A1 | 9/2021 | Lu et al. |
| 2021/0308566 A1 | 10/2021 | Kong et al. |

(56) References Cited

U.S. PATENT DOCUMENTS

| | | | |
|---|---|---|---|
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0048793 A1 | 2/2023 | Lee |
| 2023/0105605 A1 | 4/2023 | Lu et al. |
| 2023/0136977 A1 | 5/2023 | Miura |
| 2023/0182011 A1 | 6/2023 | Vroom et al. |
| 2023/0211235 A1 | 7/2023 | Xu |
| 2023/0271082 A1 | 8/2023 | Khaira et al. |
| 2023/0356076 A1 | 11/2023 | Maker |
| 2023/0421696 A1 | 12/2023 | Bohannon |
| 2024/0009564 A1 | 1/2024 | Schembri |
| 2024/0042313 A1 | 2/2024 | Benedetto |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0226721 A1 | 7/2024 | Lake et al. |
| 2024/0307760 A1 | 9/2024 | Aldridge et al. |
| 2024/0333804 A1 | 10/2024 | Wei et al. |
| 2024/0390786 A1 | 11/2024 | Aldridge et al. |
| 2025/0025773 A1 | 1/2025 | Maker |
| 2025/0025776 A1 | 1/2025 | Maker |
| 2025/0032900 A1 | 1/2025 | Khaira |
| 2025/0032901 A1 | 1/2025 | Boegli |
| 2025/0032903 A1 | 1/2025 | Khaira |
| 2025/0032904 A1 | 1/2025 | Khaira |
| 2025/0032913 A1 | 1/2025 | Abe |
| 2025/0041712 A1 | 2/2025 | Khaira |
| 2025/0058213 A1 | 2/2025 | Khaira et al. |
| 2025/0090945 A1 | 3/2025 | Koch et al. |
| 2025/0090946 A1 | 3/2025 | Koch et al. |
| 2025/0090947 A1 | 3/2025 | Khaira et al. |
| 2025/0128152 A1 | 4/2025 | Khaira et al. |
| 2025/0153035 A1 | 5/2025 | Torres et al. |
| 2025/0153045 A1 | 5/2025 | O'Connor et al. |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 109062842 A | 12/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 3224691 B1 | 4/2018 |
| EP | 3375502 A1 | 9/2018 |
| EP | 3782709 A1 | 2/2021 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO 2021/178242 A1 | 9/2021 |
| WO | WO2022/161834 A1 | 8/2022 |
| WO | WO 2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |
| WO | WO2024/248845 A1 | 12/2024 |
| WO | WO 2025/029566 A1 | 2/2025 |
| WO | WO2025/042684 A1 | 2/2025 |
| WO | WO2025/058942 A1 | 3/2025 |

OTHER PUBLICATIONS

US 12,047,455 B2, 07/2024, Wei et al. (withdrawn)
Office Action, Advisory Action, in U.S. Appl. No. 17/504,260, dated Nov. 14, 2024.
Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.
M-Con; obtained from the Internet on Nov. 17, 2024; URL: https://www.m-con.co/; 6 pages.
U.S. Appl. No. 63/770,124, filed Mar. 2025, Khaira.
U.S. Appl. No. 63/781,523, filed Apr. 2025, Khaira.
Office Action in U.S. Appl. No. 18/086,077, dated Mar. 14, 2025.
Office Action in U.S. Appl. No. 18/136,509, dated Apr. 1, 2025.
Jovanee, Alice, The new 8Bitdo Ultimate controller comes in October, https://www.theverge.com/2022/8/30/23326887/8bitdo-ulti mate-pro-control ler-bluetooth-preorder-nintendo-switch-wireless, Aug. 30, 2022 (Year: 2022), 3 pages.
Lon.tv, GameSir X2 USB-C Android Game Controller Review (Newest Version), https://www.youtube.com/watch?v=9Kzytm8D6qk,Nov. 24, 2021 (Year: 2021), 8 pages.
Notice of allowance in U.S. Appl. No. 17/504,299, dated Apr. 15, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].

(56) References Cited

OTHER PUBLICATIONS

U.S. Appl. No. 17/866,166, filed Jul. 15, 2022 entitled "Game Controller for a Mobile Device with Flat Flex Connector."
U.S. Appl. No. 17/866,234, filed Jul. 15, 2022 entitled "Game Controller for a Mobile Device with Extended Bumper Button."
U.S. Appl. No. 18/076,121, filed Dec. 6, 2022 entitled "Contextually-Aware Platform Service Switcher."
U.S. Appl. No. 18/076,166, filed Dec. 6, 2022 entitled "System and Method for Automatic Content Capability Detection."
U.S. Appl. No. 18/076,172, filed Dec. 6, 2022 entitled "System and Method for Rich Content Browsing Multitasking on Device Operating Systems with Multitasking Limitations."
U.S. Appl. No. 18/136,509, filed Apr. 19, 2023 entitled "Universal Mobile Game Controller."
U.S. Appl. No. 18/214,917, filed Jun. 27, 2023 entitled "Game Controller with Play-on-Any-Screen Feature."
U.S. Appl. No. 18/214,949, filed Jun. 27, 2023 entitled "Software-Enabled Mobile Game Controller with Integrated Platform Operating Service."
U.S. Appl. No. 18/202,755, filed May 26, 2023 entitled "Cloud Game Queueing."
U.S. Appl. No. 18/226,883, filed Jul. 27, 2023 entitled "Platform-Customized Mobile Game Controller and Methods for Use Therewith."
"Backbone One"; Mobile gaming hardware product page; Backbone; Dec. 9, 2022; 7 pages.
"Digital Depth: All Controller Universal & Fully Customizable"; Kickstarter project page for customizable game controller; Digital Depth Inc.; Aug. 4, 2021, 25 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.
"AVPictureInPictureController: A controller that responds to user-initiated Picture in Picture playback of video in a floating, resizable window"; Apple Developer Documentation, AVKit; downloaded fromt the Internet on Nov. 27, 2022 at https://developer.apple.com/documentation/avkit/avpictureinpicturecontroller; Apple Inc.; 2022; 8 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.
"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
Max Tech; Backbone One Review—The Best iPhone Gaming Controller!; YouTube product review video; downloaded from the Internet on Nov. 29, 2022 at https://www.youtube.com/watch?v=zRJQjt2nzDo; YouTube; Jun. 2022; 4 pages.
"Game Center"; Apple Developer Game Center overview; downloaded from the Internet on Nov. 29, 2022 at https://developer.apple.com/game-center/; Apple Inc.; 2022; 4 pages.
Tech & Design; "How to Set up New Nintendo Switch I Beginners Guide I First Time Turning On"; YouTube product review video; downloaded from the Internet on Nov. 29, 2022 at https://www.youtube.com/watch?v=XtMcQ9IAkCc; YouTube; 2021; 4 pages.
Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.
"Why queue in geforce now so long? I try to answer for this question" Reddit, GeForceNOW comments; downloaded from the Internet on Jun. 7, 2023 at why_queue_ingeforce_now_so_long?_I_try_to_answer_for_this_question_:_r/GeForceNOW (reddit.com); Reddit Inc.; Jun. 1, 2023; 6 pages.
Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.
Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.
Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.
Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.
Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.
Schofield, T.; "Logitech G Cloud Unboxing and Hands On!"; YouTube product review video; downloaded from the Internet on Nov. 29, 2022 at https://www.youtube.com/watch?v=speoPL5vqX0; YouTube; Nov. 2022; 3 pages.
Sholtz, M.; "The Razer Kishi V2 offers a new Virtual Controller mode, and it's pretty slick"; Android Police Newsletter article; downloaded from the Internet on Aug. 16, 2023 at The_Razer_Kishi_V2_offers_a_new_Virtual_Controller_mode,_and_it's_pretty_slick (androidpolice.com); Jan. 21, 2023; 7 pages.
Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.
"Rayz Pro"; Pioneer Rayz™ Pro earbuds product page; downloaded from the Internet on Aug. 16, 2023 at Rayz_Pro_Earphone—Pioneer_Rayz; Pioneer Rayz; 2023; 9 pages.
International Search Report and Written Opinion of the International Searching Authority issued in International Application No. PCT/US2021/019941, mailed Jun. 9, 2021 (11 pages).

(56) References Cited

OTHER PUBLICATIONS

Office Action in U.S. Appl. No. 17/504,260, dated Jul. 23, 2024.
International Search Report and Written Opinion of the International Searching Authority issued in International Application No. PCT/US2024/019901, mailed Jul. 17, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
Notice of allowance in U.S. Appl. No. 17/856,895, dated Apr. 16, 2024.
Office Action in U.S. Appl. No. 18/405,077, dated May 7, 2024.
International Search Report and Written Opinion of the International Searching Authority issued in International Application No. PCT/US2024/010404, mailed Apr. 24, 2024 (16 pages).
Notice of allowance in U.S. Appl. No. 17/504,283, dated May 29, 2024.
Notice of allowance in U.S. Appl. No. 17/504,299, dated Jun. 12, 2024.
Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/086,103, dated May 28, 2024.
International Search Report and Written Opinion of the International Searching Authority issued in International Application No. PCT/US2023/079521, mailed May 24, 2024 (15 pages).
U.S. Appl. No. 18/746,611, filed Jun. 2024, Ivan Torres.
U.S. Appl. No. 18/739,527, filed Jun. 2024, Hong Tai Wei.
Notice of allowance in U.S. Appl. No. 18/076,146, dated Jul. 22, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
U.S. Appl. No. 19/013,753, filed Jan. 2025, Khaira.
U.S. Appl. No. 63/743,503, filed Jan. 2025, Khaira.
Notice of allowance in U.S. Appl. No. 18/405,077, dated Dec. 26, 2024.
Notice of allowance in U.S. Appl. No. 18/405,077, dated Jan. 13, 2025.
Notice of allowance in U.S. Appl. No. 18/734,411 dated Jan. 13, 2025.
Office Action in U.S. Appl. No. 18/076,172, dated Jan. 10, 2025.
International Preliminary Report on Patentability in International Application No. PCT/US2023/031919, mailed Jan. 16, 2025.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/987,772, filed Nov. 2022, Sorensen.
U.S. Appl. No. 18/086,077, filed Dec. 2022, Maker.
U.S. Appl. No. 18/086,103, filed Dec. 2022, Maker.
U.S. Appl. No. 18/138,377, filed Apr. 2023, Sorensen et al.
U.S. Appl. No. 18/195,152, filed May 2023, Khaira.
U.S. Appl. No. 18/224,508, filed Jul. 2023, Maker.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.
Office Action in U.S. Appl. No. 17/856,895, dated Mar. 12, 2024.
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.
GameSir G8 Plus Bluetooth Mobile Controller—Big Enough as You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.
Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.
Nintendo Switch—Nintendo—Official Site, obtained from the Internet on Oct. 10, 2024; URL: https://www.nintendo.com/us/switch/system/, 17 pages.
Nintendo switch internal—Search Images (bing.com), obtained from the Internet on Oct. 10, 2024; URL: https://www.bing.com/

(56) References Cited

OTHER PUBLICATIONS images/search?view=detailV2&ccid=87gF12WI&id=
31A64F955C01D87035FBF76FC2B1082808CDF4C2&thid=OIP.
87gF12WIjRYTL2hDhEBZtQAAAA&mediaurl=https%3a%2f%
2fwww.allaboutcircuits.com%2fuploads%2farticles%2fMouser_IA_
Switch_figure5.jpg&cdnurl=https%3a%2f%2fth.bing.com%2fth%
2fid%2fR.f3b805d765888d16132f6843844059b5%3frik%
3dwvTNCCglscJv9w%26pid%3dImgRaw%26r%3d0&exph=355
&expw=474&q=ninetnedo+switch+internal&simid=
608038160133663134&FORM=IRPRST&ck=
C6F7BED9A8A0BA549A06B2B38B157AFA&selectedIndex=1
&itb=0&ajaxhist=0&ajaxserp=0, 4 pages.
U.S. Appl. No. 18/734,411, filed Jun. 2024, Maker.
U.S. Appl. No. 18/777,919, filed Jul. 2024, Khaira et al.
U.S. Appl. No. 18/805,902, filed Aug. 2024, Khaira et al.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
U.S. Appl. No. 18/813,384, filed Aug. 2024, Maker.
U.S. Appl. No. 18/915,580, filed Oct. 2024, Khaira et al.
U.S. Appl. No. 18/915,648, filed Oct. 2024, Khaira et al.
U.S. Appl. No. 18/942,103, filed Nov. 2024, Scott et al.
U.S. Appl. No. 18/945,830, filed Nov. 2024, Khaira et al.
U.S. Appl. No. 18/962,755, filed Nov. 2024, Khaira et al.
U.S. Appl. No. 18/967,940, filed Dec. 2024, Khaira et al.
Notice of allowance in U.S. Appl. No. 17/504,260, dated Dec. 9, 2024.
Notice of allowance in U.S. Appl. No. 18/405,077, dated Dec. 12, 2024.
Office Action in U.S. Appl. No. 18/076,172, dated Dec. 2, 2024.
International Search Report and Written Opinion of the International Searching Authority issued in International Application No. PCT/US2024/039193, mailed Nov. 11, 2024 (16 pages).
International Search Report and Written Opinion of the International Searching Authority issued in International Application No. PCT/US2024/039487, mailed Nov. 18, 2024 (20 pages).
International Search Report and Written Opinion of the International Searching Authority issued in International Application No. PCT/US2024/042461, mailed Nov. 12, 2024 (13 pages).
Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 p. 3, 5 pages.
Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.
ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.
U.S. Appl. No. 19/068,177, filed Mar. 2025, Lake et al.
U.S. Appl. No. 19/096,915, filed Apr. 2025, Maker.
Notice of allowance in U.S. Appl. No. 18/136,509 dated Apr. 24, 2025.
Office Action in U.S. Appl. No. 18/076,121, dated Apr. 16, 2025.
Office Action in U.S. Appl. No. 18/076,172, dated May 12, 2025.
Office Action in U.S. Appl. No. 18/202,755, dated May 7, 2025.
Office Action in U.S. Appl. No. 18/226,883, dated Jun. 6, 2025.
Office Action in U.S. Appl. No. 18/226,892, dated Jun. 2, 2025.
International Preliminary Report on Patentability in International Application No. PCT/US2023/036609, mailed May 15, 2025.
International Preliminary Report on Patentability in International Application No. PCT/US2023/079518 mailed May 22, 2025.
International Preliminary Report on Patentability in International Application No. PCT/US2023/079521 mailed May 22, 2025.
International Search Report and Written Opinion of the International Searching Authority issued in International Application No. PCT/US2024/045554, mailed Dec. 12, 2024.
Office Action—Communication pursuant to Rules 161(1) and 162 EPC in Europe Application No. 23817600.2, dated Jun. 12, 2025.
Notice of allowance in U.S. Appl. No. 18/076,121, dated Jun. 23, 2025.
International Preliminary Report on Patentability in International Application No. PCT/US2023/081101, mailed Jul. 3, 2025.
International Preliminary Report on Patentability in International Application No. PCT/US2024/010404, mailed Jul. 17, 2025.

\* cited by examiner

MOBILE GAME CONTROLLER AND METHOD FOR CONNECTING TO A WIRELESS AUDIO DEVICE

BACKGROUND

A game controller can provide input to a video game (e.g., to control an object or character in the video game) and, optionally, to interact with a graphical user interface (e.g., to select the video game and/or perform other functions). The game controller can be connected with a mobile computing device, such as a mobile phone, and the game can be played locally on the mobile computing device or remotely via the mobile computing device.

DETAILED DESCRIPTION

I. Introduction

As mentioned above, a game controller can provide input to a video game (e.g., to control an object or character in the video game) and, optionally, to interact with a graphical user interface (e.g., to select the video game and/or perform other functions). The game controller can be connected with a mobile computing device, such as a mobile phone, and the game can be played locally on the mobile computing device or remotely via the mobile computing device.

Figure 1:
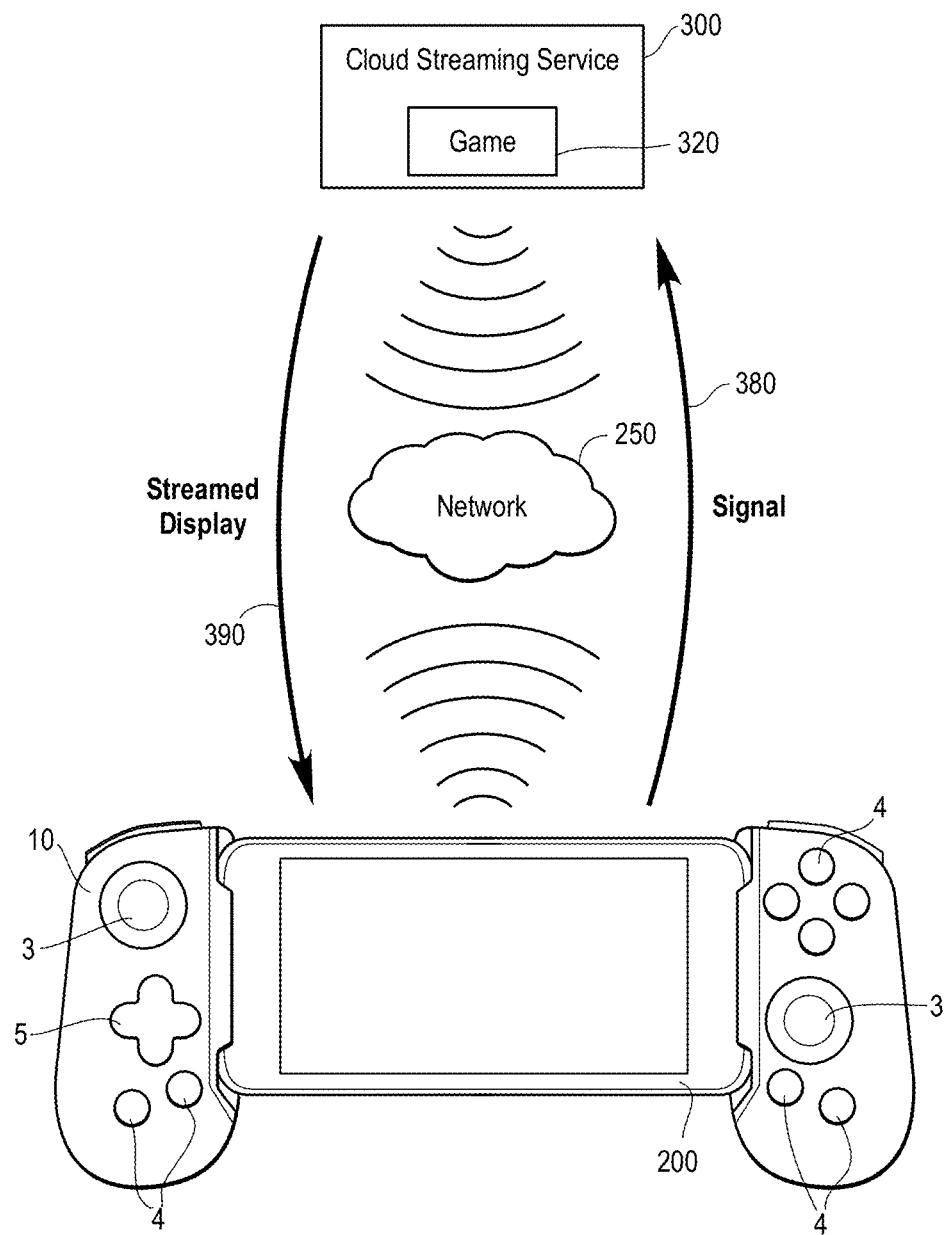
FIG. 1 is an illustration of a network environment of an embodiment.
Figure 2:
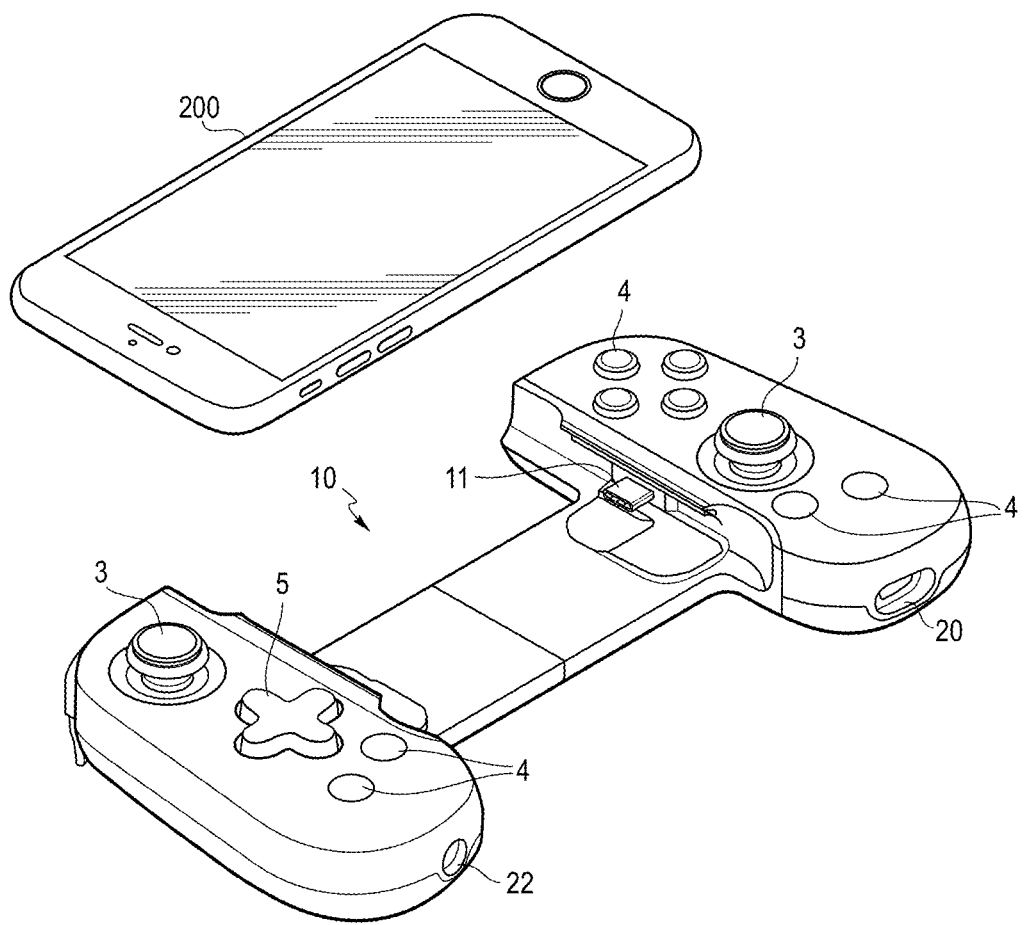
FIG. 2 is an illustration of an example game controller and mobile computing device of an embodiment.

The examples used herein may often refer to a mobile phone or similar device that connects with, or attaches to, a game controller. For instance, FIGS. 1 and 2 show illustrations of such an embodiment. However, it should be appreciated that a device like that of a mobile phone or tablet might be permanently (or more permanently) fixed to the game controller, such that the game controller with a fixed screen includes all (or most of) the functionality of a game controller and a mobile phone.

It should also be understood that the details of where a game is stored in memory and/or storage or accessed may not necessarily be important to the embodiments described below unless expressly claimed as such. For instance, a game might be stored locally on the game controller (in firmware or accessible memory and/or storage), a game might be stored locally on a mobile phone or tablet, a game might be stored on a game console device (and accessible via a local area network, LAN, and/or wide area network, WAN, and/or other network like cellular), a game might be stored on a server device in the cloud (and accessible via a local area network, LAN, and/or wide area network, WAN, and/or other network like cellular), and/or a game might be partially stored in one location or another, such as downloaded while offline and reconnected to the cloud when back online.

In one embodiment, a mobile game controller is provided comprising: a user input element; one or more processors; a non-transitory computer-readable medium; and program instructions stored on the non-transitory computer-readable medium that, when executed by the one or more processors, cause the one or more processors to perform functions comprising: detecting user actuation of the user input element; and informing a computing device in communication with the mobile game controller of the user actuation of the user input element, wherein a default action associated with the user actuation of the user input element is to cause a game application to open on the computing device.

In another embodiment, a method is provided that is performed by a platform operating service application in a computing device in communication with a mobile game controller. The method comprises: receiving, from the mobile game controller, information that indicates that the mobile game controller is associated with a gaming platform; selecting a graphical representation of the mobile game controller that is specific to the gaming platform; and displaying the selected graphical representation of the mobile game controller on a display of the computing device.

In yet another embodiment, a non-transitory computer-readable medium is provided storing program instructions that, when executed by one or more processors of a computing device, cause the one or more processors to perform functions comprising: receiving, from the mobile game controller, information that indicates that the mobile game controller is associated with a specific gaming platform; in response to receiving the information, automatically displaying an identification of one or more games remotely playable from a user's game console, wherein the user's game console is associated with the specific gaming platform; receiving a selection of a game; and streaming the selected game from the user's game console to the computing device for remote play.

In a further embodiment, a mobile game controller is provided comprising: one or more processors; a non-transitory computer-readable medium; and program instructions stored on the non-transitory computer-readable medium that, when executed by the one or more processors, cause the one or more processors to perform functions comprising: receiving, from a computing device connected with the mobile game controller, pairing information from a wireless audio device, wherein the computing device is configured to receive the pairing information from the wireless audio device over a first wireless communication channel; and using the pairing information to wirelessly connect to the wireless audio device over a second wireless communication channel, wherein the second wireless communication channel is different from the first wireless communication channel.

In an additional embodiment, a method is provided that is performed in a mobile game controller. The method comprises: receiving, from a computing device connected with the mobile game controller, pairing information from a wireless audio device, wherein the computing device receives the pairing information from the wireless audio device over Bluetooth; using the pairing information to wirelessly connect to the wireless audio device over a proprietary wireless audio solution; and routing audio from the computing device to the wireless audio device over the proprietary wireless audio solution.

In yet another additional embodiment, a non-transitory computer-readable medium is provided storing program instructions that, when executed by one or more processors of a mobile game controller, cause the one or more processors to perform functions comprising: receiving, from a computing device connected with the mobile game controller, pairing information from a wireless audio device, wherein the computing device receives the pairing information from the wireless audio device over a first wireless communication channel; using the pairing information to wirelessly connect to the wireless audio device over a second wireless communication channel; and routing audio from the computing device to the wireless audio device over the second wireless communication channel.

Other embodiments are provided, and any of the embodiments described herein can be used alone or in combination with one another.

Before turning to a description of example implementations, it is understood that this section provides an overview of an example game controller and computing device. These are merely examples and other implementations can be used. Accordingly, it is important to note that none of the details presented herein should be read into the claims unless expressly recited therein.

II. Overview of Example Game Controller and Computing Device

FIG. 1 is an illustration of an example game controller 10 and computing device (here, a mobile phone 200) of an embodiment. As shown in FIG. 1, the game controller 10 in this example has several user input elements ("control surface"), such as joysticks 3, buttons 4, and toggle switches 5. Other types of user input elements can be used, such as, but not limited to, a switch, a knob, a touch-sensitive screen/pad, a microphone for audio input (e.g., to capture a voice command or sound), a camera for video input (e.g., to capture a hand or facial gesture), etc. Additionally, the game controller 10 can comprise one or more processors, and a non-transitory computer-readable medium having program instructions stored therein that, when executed by any of the one or more processors, cause the one or more processors to perform various functions, such as, but not limited to, some or all of the functions described herein. It is understood depending on how the game controller 10 is programmed that a single processor of the game controller 10 might execute all of the program instructions or different processors (if the game controller 10 comprises more than one processor) might execute different portions of the program instructions. The game controller 10 can comprise additional or different components, some of which are discussed below.

In this example, the computing device takes the form of a mobile phone 200 (e.g., Android or iPhone). However, in other examples, the computing device takes the form of a tablet or other type of computing device. The mobile phone 200 in this example comprises a touch-screen display, a battery, one or more processors, and a non-transitory computer-readable medium having program instructions stored therein that, when executed by the one or more processors, cause any of the one or more processors to perform various functions, such as, but not limited to, some or all of the functions described herein. The mobile phone 200 can comprise additional or different components, some of which are discussed below.

In operation, the game controller 10 can be used to play a game that is locally stored on the mobile phone 200 (a "native game") or a game 320 that is playable remotely via a network 250 (e.g., via a cloud streaming service 300 and/or from a game console (not shown in FIG. 1), as will be discussed below). For example, during remote gameplay, the computing device 200 can send signals 380 to the cloud streaming service 300 based on input from the game controller 10 and receive streamed data 390 back for display on the phone's touch screen. In one example, a browser on the mobile phone 200 is used to send and receive the signals 380, 390 to stream the game 320 to the user. The mobile phone 200 can run an application configured for use with the game controller 10 ("game controller app") to facilitate the selection of a game, as well as other functions of the game controller 10. U.S. patent application Ser. No. 18/214,949, filed Jun. 27, 2023, which is hereby incorporated by reference provides additional example use cases for the game controller 10 and mobile phone 200.

It is understood that while the game controller 10 may be remote, or set apart, from a game console (when, for example, a game is played from a game console), the game console itself might be in close proximity to the game controller 10, such as in the same room or house. In such instances, the game controller 10 may communicate with the game console via a local area network (LAN) or via Bluetooth or some other wireless (or wired) network. It is also possible that the game console is located far away from the game controller 10, and accessible via one or more wireless networks (e.g., LAN and/or WAN and/or cellular networks).

As shown in FIG. 2, in this example, the game controller 10 takes the form of a retractable device, which, when in an extended position, is able to accept the mobile phone 200. In operation, a user would pull the left and right handles of the game controller 10 apart while inserting the mobile device 200 into the game controller 10, aligning the male plug 11 with the corresponding female port on the mobile phone 200. To assist in this process, game controller 10 can be configured such that once the handles are pulled apart sufficiently, the handles lock in place, allowing the user to easily insert the mobile device 200. Then, by applying light pressure on the handles, the user can unlock the handles and snap the mobile controller 10 shut, securing the mobile phone 200 to the game controller 10. More information about this and other mechanisms that can be used in the game controller 10 can be found in U.S. patent application Ser. No. 17/856,895, filed Jul. 1, 2022, which is hereby incorporated by reference. That application also describes another example game controller implementation that can be used with these embodiments, where the game controller has a magnetic connector to magnetically retain a mobile computing device (e.g., a mobile phone) to the game controller (and, optionally, for communication and/or charging). It is understood that other types or designs of game controllers may be used.

As also shown in FIG. 2, the game controller 10 in this embodiment has a pass-through charging port 20 that allows the battery of the mobile phone 200 (and/or the battery/batteries of the game controller 10, if so equipped) to be charged, as well as a headphone jack 22. Further, in this example, a male communication plug 11 on the game controller 10 mates with a female communication port on the mobile phone 200 to place the controller 10 and the mobile phone 200 in communication with one another. In this particular example implementation, the male communication plug 11 takes the form of a USB-C plug, although other types of plugs can be used. U.S. patent application Ser. No. 18/136,509, filed Apr. 19, 2023, and U.S. Provisional Patent Application No. 63/524,014, filed Jun. 29, 2023, both of which are hereby incorporated by reference, describe embodiments that can be used to help allow the game controller 10 to be used with mobile phones having different operating system (e.g., Android vs. iOS).

It should be understood that the game controller 10 may be, as often would be the case, sold in stores or online separately from the mobile phone 200, and without a power source (or with a previously charged or uncharged power source, if so equipped with a battery/batteries). With the appropriate firmware and/or software updates loaded onto the game controller 10 (for example, firmware and/or software loaded either prior to or after actual purchase of the game controller 10), the game controller 10 may be equipped to enable functionality such as described herein. The game controller 10 by itself then may drive significant consumer demand for its capabilities. Additionally, the game controller 10 paired together with a device such as mobile phone 200 (permanently fixed to the game controller or not) can provide additional consumer value as the two devices, now joined as one device, may provide full and delightful gaming experiences, such as described herein.

III. Examples of Platform-Customized Mobile Game Controllers

As mentioned above, a game controller can be used to play a game that is locally stored on the mobile computing device connected to it (a "native game") or a game that is playable remotely via communications between the mobile computing device and a remote device. In one embodiment, as mentioned above, the remote play is provided from a game console. For example, Sony's PlayStation, in addition to Xbox and Steam, has a feature called "Remote Play," in which PlayStation games can be streamed from a user's PlayStation console (e.g., PS5 or PS4) to a mobile computing device, such as a mobile phone or tablet (e.g., an Apple iOS or Android device) or a computer (e.g., a PC or Mac). It is important to note that other remote play or cloud gaming services can be used (e.g., Apple Arcade, Steam Link, Steam Cloud Play, Netflix Games, Amazon Luna, Xbox Remote Play, Xbox Cloud Gaming, Nvidia Geforce NOW, Xbox, Xbox Game Pass, etc.). Accordingly, while the following examples will be described in terms of PlayStation and Remote Play, these embodiments are not limited to just PlayStation and Remote Play. As such and as stated previously, the details presented herein should not be read into the claims unless expressly recited therein. In another embodiment, the app and/or game is pre-loaded or downloaded to the game controller 100 (e.g., connected to an external screen) or to the mobile computing device, which would allow offline gaming where networks are not available.

In operation, a user can download the Remote Play app to the user's mobile phone and stream games from the user's PlayStation console to the user's mobile phone using the Remote Play app. In addition to streaming and playing games, the Remote Play app allows the user to switch between games, view the console home screen, and browse the console's menus. The user can start playing a game on the PlayStation console (e.g., connected to a TV), pause the game, and later resume the game on the user's mobile phone at a location remote from the user's PlayStation console (e.g., outside of the house or in another room in the house). The user can use the game controller 10 to place the game on the mobile phone 200.

In one embodiment, the game controller is customized for the PlayStation platform. (As mentioned above, PlayStation is merely an example, and the game controller can be platform-customized for any suitable game system/console/service/company.) The customization can take any suitable form. For example, as mentioned above, the mobile phone (or other computing device) can run an application configured for use with the game controller ("game controller app") to facilitate the selection of a game, as well as other functions of the game controller. The game controller app can provide a menu of native and/or remote games to choose from, and the game controller app can provide various PlayStation integrations. In another embodiment, the game controller app could just consist of all remote games or all native games as well. Any combination of games via the App Store (Native), Cloud Gaming, and Remote Play. So, for example, PlayStation could release an app that allows you to launch both cloud games and remote play games inside of it—all in one place.

As an example of one of those integrations, when the game controller app displays button symbols for the game controller, it can display the custom glyphs (graphics) that match the physical buttons on the game controller, even if the glyphs are different from the operating system default. For example, in iOS devices, a "com.playstation.olp.dualsense" protocol string (stored in the game controller) can flag the game controller as having PS glyphs, as iOS devices may use the protocol string to determine a specific controller type, and each game controller type can have a setting for what glyphs to use. This protocol string can cause the game controller to automatically show up as a PlayStation controller with the correct icons inside of games because the operating system of the mobile phone automatically recognizes the game controller as a "PlayStation" controller. This automatic recognition avoids the need for developers to whitelist the game controller manually, which may be burdensome. In another embodiment, the operating system can use existing identifiers (e.g., USB product identifier or product screen) to identify the glyphs to use.

Figure 3:
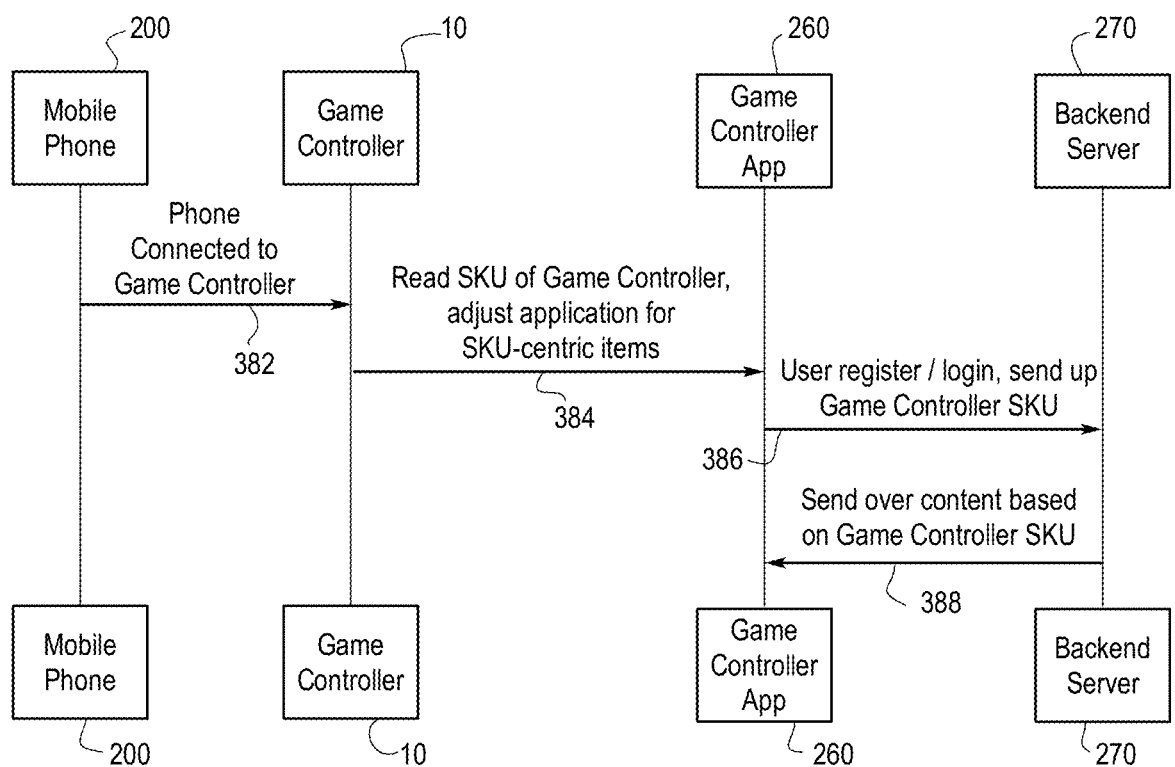
FIG. 3 is an example flow diagram for a method of an embodiment for content segmentation based on a game controller's stock keeping unit (SKU) information.

As another example of customization, the game controller app can provide the ability to browse PlayStation game titles. In one embodiment, the content available for selection by the user via the game controller app can be segmented based on stock keeping unit ("SKU") information. FIG. 3 is a flow diagram for the situation in which different content is served based on the game controller's SKU. As shown in FIG. 3, when the game controller 10 is connected with the mobile phone 200 (act 382), the SKU of the game controller 10 is read by the game controller app 260 to adjust the game controller app 260 for SKU-centric items (here, platform-specific items) (act 384). The game controller app 260 then registers with a backend server 270, which can move the user into a new user segment (act 386). The user-segmented home screen can cause a PlayStation-customized set of content to be loaded (e.g., a PlayStation Remote Play row of games) (act 388). For example, the game controller app can have a dedicated row with new releases and updates from PlayStation.

If, for example, a user selects a PlayStation game, the game controller app can automatically deep link into the PlayStation app to install it onto the user's PlayStation console remotely, so the user can play it later via PS Remote Play. More specifically, for PlayStation app deep linking, the PS app can be launched using a standard URL open routine in iOS. The link can be to the PlayStation website, which does an automatic redirect to the PlayStation app, if installed. The automatic redirect can happen via Apple App Site Association ("AASA"), which is a web-to-app protocol. The PlayStation app can be detected through an existing iOS application program interface (API) called canOpenURL. In other embodiments, a user's list of consoles can appear inside the app, and the user can launch a given console directly from the game controller app.

Additionally, if the game controller app is used with an un-connected game controller, the entire interface can automatically adapt to portrait mode and every component can become native to touch, all while maintaining the game controller app's animations and cinematic immersion. This can make it easier to discover new games to play, watch game highlights, or play with friends. After the game controller is connected to the mobile phone, the game controller app can automatically transition back from Standalone Mode to Controller Mode.

The following is an example use case flow. This is only an example, and other flows can be used. In this example, the game controller app fetches a PlayStation user's console/computer list, so that the user can start a Remote Play session and play the user's console almost instantly. In this example, the user would connect the user's PlayStation account to the user's game controller account (e.g., using an OAuth account link). The game controller app would then fetch the user's console list (e.g., Shawn's PS5, Shawn's PS4 Pro) using partner APIs. If no console list is available, the game controller app can guide the user through a set up or link the user into the partner app directly to do so. The game controller app can then display a curated list of consoles (e.g. Shawn's PS5, Shawn's Xbox Series X) in the home screen of the game controller app, so the user can navigate to it directly. The user can then launch the console by opening the Remote Play app via a deep link or universal link or open an embedded view within the game controller app, allowing the user to play natively within the game controller app. In certain embodiments, the user can do this with multiple console platforms, so a user's Xbox, PlayStation, and gaming PC, for example, can all be shown, which allows the user to move between the user's different consoles instantly, without having to, for example, change inputs on the TV and change the game controller the user is using, as the user would normally do if playing in the user's living room, for example.

Figure 4:
FIG. 4 is an illustration of an example customized game controller of an embodiment.

As another example of customization, in one embodiment (see FIG. 4), the look and feel of the game controller 10 uses colors, materials, and finishes that look similar to the PS5 console's DualSense wireless controller, mimicking the transparent face buttons and visually-distinctive floating appearance by using the PS5 5 design language with an alternating color scheme and a split parting line on the front side. Also, as shown in FIG. 4, instead of the four buttons 4A being ABXY buttons, the four buttons 4A on this PlayStation-edition game controller are the PlayStation circle, triangle, cross, and square icons. (As noted above, custom glyphs can be displayed to the user, so the displayed graphic of the game controller matches the actual game controller used.)

In one embodiment, a button on game controller 10 is used to open the PlayStation app and/or a specific function within their app or service. As will be discussed in detail below, the button can be an existing button on the game controller 10 that has multiple functions, with a specific gesture being used to trigger the open PlayStation app function, or the button can be a dedicated button (e.g., an additional button added to the game controller 10 or the replacement of a single-use existing button on the game controller 10). It is understood that a button dedicated to a game platform (such as PlayStation) may be used to launch the game platform's app or a specific function within their app or service. It is also understood that such a dedicated button might be programmed to launch a game platform experience within the game controller app. The game controller might be offered by the game platform company or by a third party, such as Backbone. A third-party game controller might enable a game controller to be switchable to one or more game platforms. For instance, a game controller manufacturer might offer a game controller that has a dedicated button that launches a PlayStation app, service, or experience. With an update to the game controller (via a software update) or by user selection, the dedicated button on the game controller might launch an app, service, or experience different from the PlayStation one (e.g., Xbox). This enables the game controller to be used with, or be dedicated to, more than one game platform, depending on how the dedicated button is programmed to execute.

In one implementation of using an existing button on the game controller 10, a double-tap gesture is used to trigger the open PlayStation app function. This implementation may be desired when a double-tap gesture is already being used with the game controller 10 (e.g., to mute a microphone), as it would be an extension to an alternate mapping. More information about double-tap detection and hardware-initiated overlay actions for a user-input element of a game controller can be found in U.S. Provisional Patent Application No. 63/452,551, filed Mar. 16, 2023, which is hereby incorporated by reference. Also, since tapping a button may imply the use of a mobile phone (or other accessory), the mobile phone can be used as an aid in the application launching process.

Various mechanisms can be used. For example, a standard human interface device (HID) game controller input can be serviced by the operating system and forwarded to the game. As another example, a custom accessory communication protocol can be used to receive the event by the game controller app, even when the game controller app is in the background to enable optional secondary behavior. If a touch-only affordance is to be provided when the game controller 10 is not plugged in, the PlayStation app deeplink (a custom URL scheme that does not link to PlayStation website) can be used, although the user may receive a prompt the first time it is used to allow the game controller app to open the PlayStation app.

Any suitable flow can be used. For example, the user can press an option button 4B multiple times, with each press sent to the game controller app. The game controller app can track the presses over time, counting the presses to detect single- or double-press gestures. If a double-press is detected, a request can be sent to the mobile phone 200 to launch the PlayStation app. This flow will be discussed in more detail below.

In this embodiment, as a shortcut, double-tapping the options button (" . . . ") 4B opens the PlayStation app. In other embodiments, double-tapping the options button 4B can mute party chat even if in-game. The first time a user mutes a party, the user can be shown a modal that lets the user know that the user can double-tap to mute. However, in this embodiment, the customized game controller will open the PlayStation app by double-tapping the options button 4B. The game controller app can recognize the SKU of the game controller, so as to know what function to perform when the options button 4B is double-tapped (e.g., if the SKU identifies the game controller as a standard, non-customized game controller, the game controller app will not open the PlayStation app when the options button 4B is double-tapped).

Double-tapping the options button 4B from both inside and outside the game controller app can open the PlayStation app on the customized game controller 10 (e.g., when the SKU is identified, as noted above). The first time the user double-taps the options button 4B, a configuration settings screen can surface on the mobile device 200 that informs the user what double-tapping does and lets the user enable or turn off (e.g., the default) double-tap options to open the PlayStation app. (If the user does not have the PlayStation app installed on the mobile phone 200, the modal can be displayed on the mobile phone 200 to allow the user to download the PlayStation app and prevent the Open PS App option from being selected.) A setting button can be in a controller settings menu to disable/re-enable the double-tap options to the PlayStation app, and a PlayStation app user education tile can be added on the user interface (in addition to or instead of sending an email to the user informing him of the double-tap options button 4B). Also, in one embodiment, if the user is in a party, double-tapping the options button 4B can mute the party instead of opening the PlayStation app (i.e., the mute-party function can take priority if the user is in a party).

Figure 5:
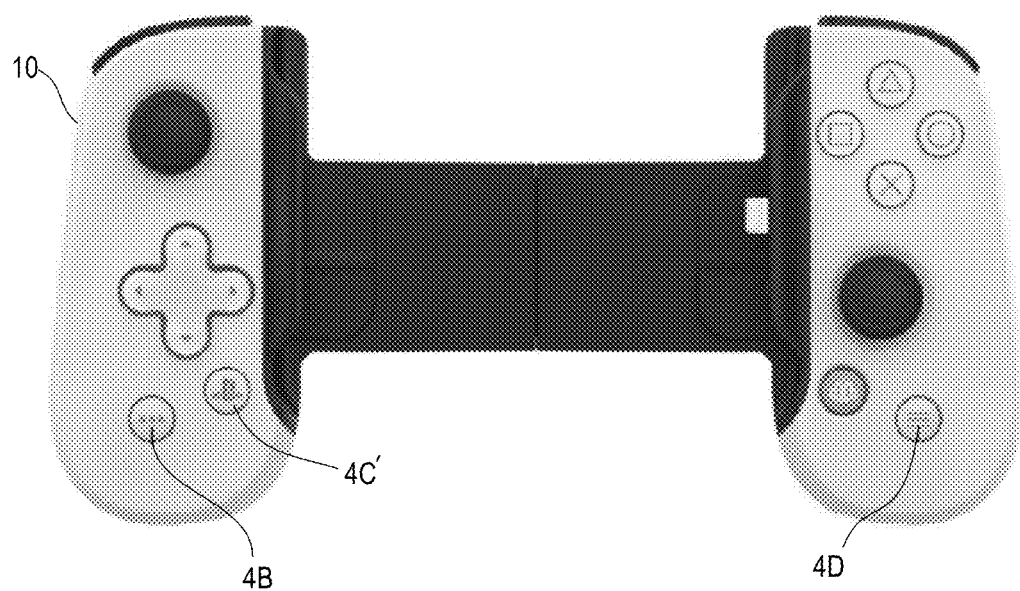
FIG. 5 is an illustration of an example customized game controller of an embodiment.

In another embodiment, instead of using a dual-purpose button, the game controller 10 can have a dedicated PlayStation app launch button 4C' (see FIG. 5). That way, when the dedicated button 4C' is pressed (once, not double-tapped), the PlayStation app will launch. In some embodiments, the pressing of the dedicated button 4C' can also launch into a PlayStation experience within the game controller app (e.g., into a PlayStation-specific page or row, or a specific service/game or user-configured shortcut within the game controller app).

In one embodiment, the user can hold down or multi-press the "dedicated" button 4C' to trigger another function, such as the "Home" command specified in Apple's Accessory Interface Specification. This command can open the system menu inside of whatever game or service is being played. For example, if the user is in the PlayStation app, holding down the dedicated button 4C' opens the PlayStation menu. As another example, if the user is in an Apple Arcade game, holding down the dedicated button 4C' opens the Game Center menu. One possible challenge is that Apple currently requires the button that performs this function to have an icon that looks like a house. This creates a problem because users coming from the console expect the dedicated PlayStation button to trigger the home function and open the PlayStation menu. To address this, the primary action (press) of the dedicated PlayStation button 4C' can launch the PlayStation app (or do something else in the PlayStation app (e.g., remote playing into the last-played console, opening a remote play, native, or cloud gaming experience (or some combination thereof) within the app, or a mode specific to game play, etc.), as discussed above. The secondary option can alternatively perform the Home command (instead of re-launching the PlayStation app) if the PlayStation app is foregrounded (i.e., a "context-aware" button). In certain embodiments, the secondary action (e.g., hold) can perform the "Home" command. It should be noted that there is a command known as "Home" in Android's Accessory Development Kit, which opens the system menu inside of whatever game or services is being played. If the user is in the PlayStation app, holding the dedicated button 4C' can open the PlayStation menu.

In some embodiments, as mentioned above, the dedicated button can be configured by a user for any suitable platform (e.g., PlayStation, Xbox, etc.). The customizations can be done by the game controller app on the mobile computing device, in the cloud (e.g., with SKUs being designated for different updates, etc.). In other embodiments, an LED or other indicator on the game controller can indicate that the button is configured for a particular service (e.g., green for PlayStation, red for Xbox, etc.).

As shown by a comparison of FIGS. 4 and 5, in this embodiment, the dedicated PlayStation button 4C' took the place of the capture button 4C. The game controller app can give the user the ability to choose whether the dedicated button 4C' acts as a capture button or as a dedicated shortcut to the PlayStation app. An advantage of this embodiment is that it allows the game controller manufacturer to share tooling between different dedicated and non-dedicated game controllers, so the game controller manufacturer does not need to make a separate version of the top housing. In certain embodiments, it also preserves symmetry of the device, which may be aesthetically advantageous given that most game controller or console systems have two system-level buttons (e.g., in Apple's Game Controller specification these are Menu and Options), and thus having two platform-level buttons, such as a dedicated button for launching the game controller app as well one for launching the PlayStation app, would enable a symmetric industrial design and overall appearance. The repurposed button can have any suitable function. For example, in one embodiment, instead of or in addition to launching the PlayStation app, the repurposed button can act as a pass-through home button, take a screenshot, or start/stop recording. In one embodiment, a short press of the repurposed button functions as a pass-through home button, while a double press launches the PlayStation app, and a long hold is a user-defined capture gesture (e.g., screenshot or record). In another embodiment, a short press of the repurposed button takes a screenshot, while a double press records, and a long hold launches the PlayStation app. In yet another embodiment, a short press or long hold of the repurposed button directly maps to a home button, a double press launches the PlayStation app, and a long hold is a user-defined capture gesture. Other gestures layouts are possible.

In another embodiment, an additional button can be added to game controller 10 as the dedicated PlayStation app button instead of overloading an existing button on the game controller 10 via gestures/configurability, which would be simpler from a software perspective. Also, doing "hold" or "double press" actions especially may introduce system latency, so having a dedicated button may be better, in some instances, for a more responsive feeling for users—valuable especially when it's a frequent action. However, repurposing the button, as discussed above, has the benefit of retaining symmetry of the user interface elements of the game controller 10, which may be important to the design language and give the appearance of an approachable design to non-gamers. In yet another alternative, the game controller 10 includes both the dedicated PlayStation app launch button as well as a separate traditional home button. In this alternative, those two buttons can be placed symmetrically. This alternative provides the advantage of avoiding the user holding a button down to trigger the home command (and, thus, avoiding the possibility of the user inadvertently triggering the press action). Also, in another alternative, button 4B is repurposed as a microphone or capture button, and button 4D is repurposed as an options button to fast-start a game, turn a microphone on/off, and/or open a capture settings menu.

The additional button can use any suitable gesture and have any suitable function. For example, a short press of the additional button can be like a home button and work like a PlayStation button, while a long hold can launch the PlayStation app. In another example, if a long hold of the home button gesture is desired, then a double-press of the additional button can launch the PlayStation app, while a short or long hold of the additional button can direct map to the home button.

In one embodiment, the home button press information can be "buffered" and replayed once there is a double-press window timeout. In general, when mixing double-press button gestures with other gestures that want to pass-through the button press state transparently, the double-press processing can destroy the original timing information. There are two main reasons why this happens. First, since it is unknown at the time of the first button down event whether the press will be a single press, double press, or press and hold, the action is, by definition, deferred and introduces latency as well as processing limitations. Second, in many systems, button activity is decoded into gestures that can be assigned a particular action (i.e., each gesture has a slot for a single action). Usually, these actions do not take in a parameter input and rarely contain timing information as their input. In addition, when a button maps indirectly (pass-through) to the state of another button, any delay in detecting the gesture is added to the pass-through button state.

To address this situation, a button state "buffer" can be maintained whose length matches the double-press window, which will "replay" once the double-press gesture has been ruled out. In addition, once double-press has been ruled out, the buffer can operate in a circular fashion, where new samples are added to the buffer at the same time that the oldest samples are removed for replay. The end result is that the original timing information is preserved and just delayed by the double-press window length. This solution can also be applied to triple (or more) press decoding schemes by adjusting the buffer length to match the maximum press window for all presses combined. In this case, shorter press sequences can use a subset of the full buffer capacity so long as the system tracks how full the buffer is when replay starts. Also, this solution is particularly advantageous for game controllers that have platform service buttons that can map indirectly to operating-system-level platform buttons (e.g., a home button). If the interface to the operating system for the home button is a digital button level (0 or 1, as opposed to an action/command interface), waiting for the full gesture decoding before updating the button level can introduce an unreasonable amount of delay.

IV. Examples of Wireless Headset Pairing

As noted above, in one embodiment, the game controller 10 has a headphone jack 22 to connect a headset. In another embodiment, the game controller 10 allows wireless headset pairing in addition to or instead of using a wired headset. It should be noted that while a headset is being used to illustrate these embodiments, any suitable "wireless audio device" (e.g., an audio output device with or without audio input capability) can be used, such as but not limited to, headphones (with or without an integrated microphone), earphones (with or without an integrated microphone), a speaker (with or without an integrated microphone), True Wireless Earbuds, etc. Also, in some embodiments, there isn't pairing info for one client radio, but there may be a need to communicate and pair with multiple client radios simultaneously (e.g., where each earbud has its own radio because there is no wire connecting the right and left ear buds).

It should also be noted that the embodiments related to wireless headset pairing can be used independent of or used in combination with the customized game controller embodiments discussed above. For example, in some embodiments, the use of a wireless audio device (e.g., a particular wireless headset) is customized to a specific game platform.

Figure 6:
FIG. 6 is an illustration of an example wireless environment of an embodiment.

Turning again to the drawings, as shown in the top portion of FIG. 6, in many environments, wireless gaming headphones 500 generally work with a transmitter and receiver pair, where the transmitter is located in a dongle 510 connected to a game console/PC 520 (or integrated into the game console/PC 520), and the receiver is located in the wireless headset 500. Although some wireless headsets use a ubiquitous wireless technology, such as Bluetooth, other headsets opt to use, or prefer to use, an alternate, proprietary wireless audio solution that offers better audio quality and radio frequency (RF) performance. As a result, mobile phones (or other compatible devices for a game controller) do not automatically interoperate with many wireless gaming headsets on the market today. Although it may be possible to design the dongle 510 so it can plug directly into the mobile phone 200, it may be difficult to make the dongle 510 small enough to not interfere with the user's hands when holding the mobile phone 200 for gaming. Additionally, certain game controller designs might not be able to accommodate a dongle plugged directly into a mobile phone.

Since the game controller 10 already physically attaches to the mobile phone 200 and supports wired audio, it is advantageous to incorporate wireless functionality in the game controller 10 itself, so the wireless headset 500 can wirelessly connect to the game controller 10, as shown in the bottom portion of FIG. 6. So, in one embodiment, the game controller 10 includes an integrated wireless module, which eliminates the need for an extra dongle and enables a rich audio experience for mobile gaming. In addition, the game controller app can provide additional functionality in software to allow for intuitive user interfaces for pairing, control, and programmable functions. These features were traditionally reserved for PC software but, in this embodiment, are now possible from the mobile device 200.

Figure 7:
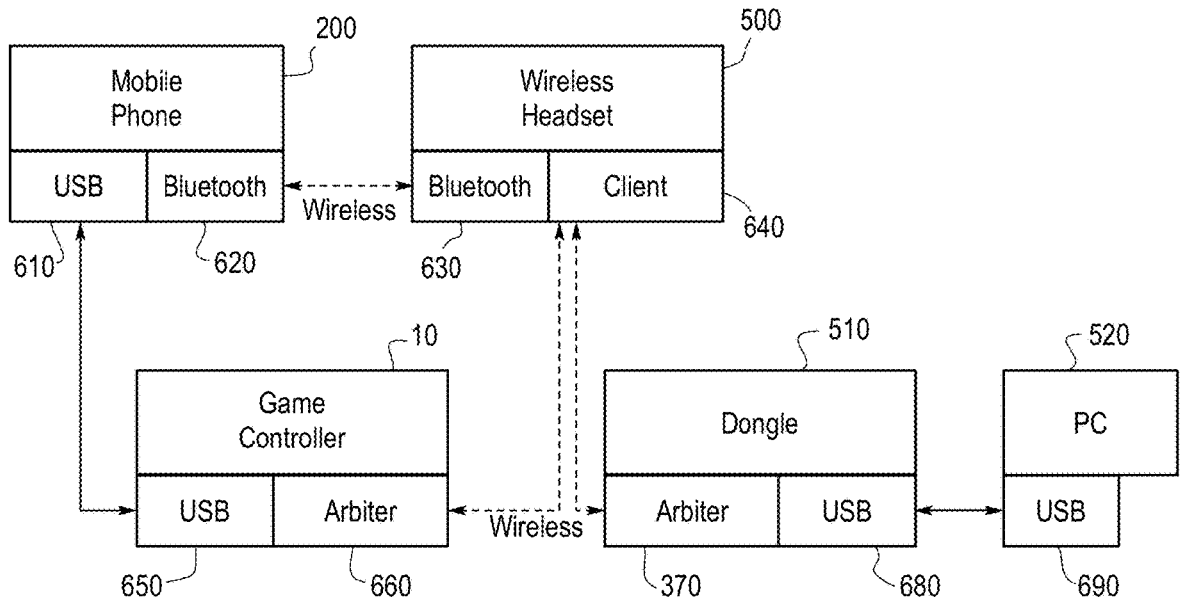
FIG. 7 is a block diagram of example components of a wireless environment of an embodiment.

FIG. 7 is a block diagram of one example implementation of this embodiment. As shown in FIG. 7, in this embodiment, the mobile phone 200 communicates with the game controller 10 over a wired connection via USB modules 610, 650 in the mobile phone 200 and game controller 10. (As discussed above, in other embodiments, mobile phone 200 and the game controller 10 communicate wirelessly.) In this embodiment, the mobile phone 200 wirelessly communicates with the wireless headset 500 via Bluetooth modules 620, 630 in the mobile phone 200 and wireless headset 500 (e.g., over a first wireless communication channel). Additionally, the wireless headset 500 wirelessly communicates with the dongle 510 via a proprietary wireless audio solution client 640 in the wireless headset 500 and a proprietary wireless audio solution arbiter 670 in the dongle 510 (e.g., via a second wireless communication channel). Alternatively, the wireless headset 500 wirelessly communicates with the game controller 10 via the proprietary wireless audio solution client 640 in the wireless headset 500 and a proprietary wireless audio solution arbiter 660 in the game controller 10 (e.g., via the second wireless communication channel). Additionally, the dongle 510 communicates with the game console (e.g., PC) 520 via a wired connection using USB modules 680, 690 in the dongle 510 and game console 520.

Figure 8:
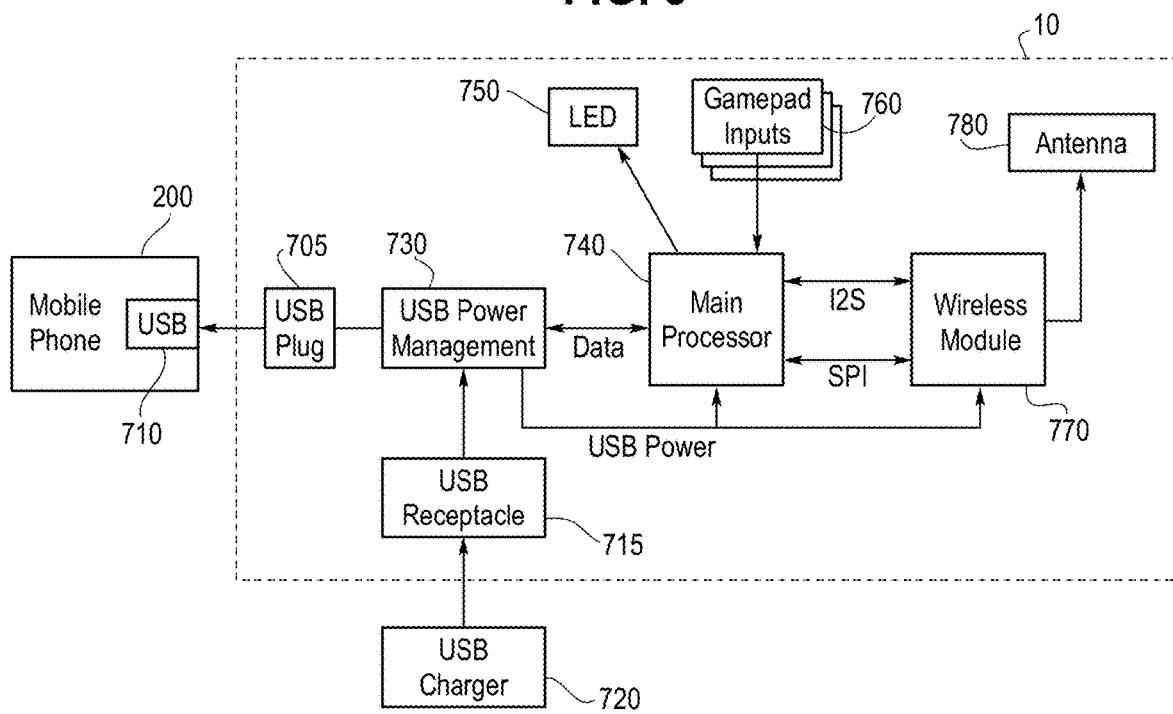
FIG. 8 is a block diagram of an example game controller of an embodiment.
Figure 9:
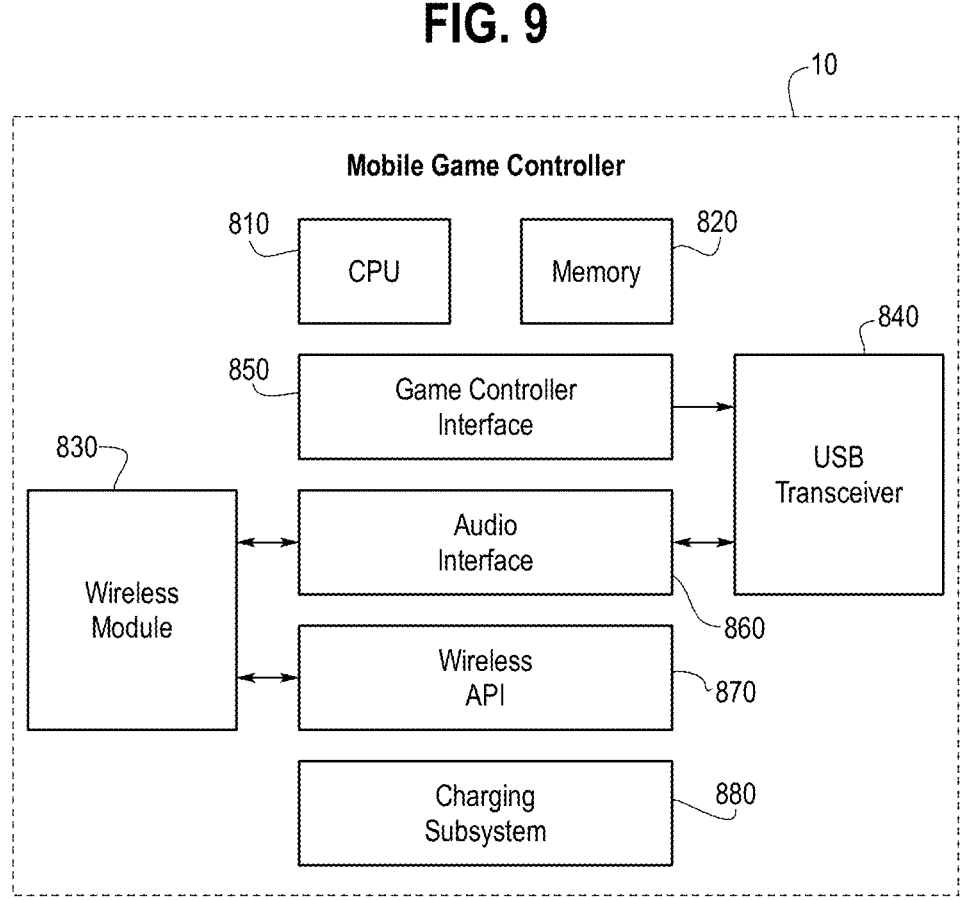
FIG. 9 is a block diagram of a software architecture of an example game controller of an embodiment.

FIG. 8 is a more-detailed block diagram of the game controller 10 of this embodiment. As shown in FIG. 8, the game controller 10 of this embodiment comprises a USB plug 705 that fits into a USB receptacle 710 on the mobile phone 200. The game controller 10 also comprises a USB receptacle 715 that accepts a USB plug of a USB charger 720. Additionally, the game controller 10 comprises a USB power management module 730, a main processor 740, LEDs 750, gamepad inputs 750, a wireless module 770, and an antenna 780. FIG. 9 is a diagram of an embedded software architecture of an embodiment. As shown in FIG. 9, in this embodiment, the game controller 10 comprises a CPU 810, a memory 820, a wireless module 830, a USB transceiver 840, a game controller interface 850, a wireless API 870, and charging subsystem 880.

In this embodiment, the wireless headset 500 is initially paired to the dongle 510 for the PC 520 and optionally over Bluetooth with the mobile phone 200 to mix-in audio from the mobile phone 200. The game controller 10 is then paired via a proprietary wireless audio solution radio to the headset 500, so that audio can be routed to the wireless headset 500. In this mode, the Bluetooth connection between the mobile phone 200 and the headset 500 is replaced with the game controller's audio path. However, the existing Bluetooth connection can help assist in pairing the proprietary wireless audio solution.

The pairing of the proprietary wireless audio solution module can be achieved in multiple ways. For example, both the arbiter and the client can manually be put into pairing mode and discover each other and exchange pairing information. As another example, pairing information can be exchanged "out of band" and stored directly into the persistent pairing tables on both devices.

In some embodiments, a three-way out-of-band (OOB) pairing is used. In some prior two-way OOB pairing systems, such as Apple's Made for iPhone ("MFI") program, a MFi accessory, such as a car stereo, can first connect to a smartphone through Lightning, which can then share Bluetooth pairing information to pair the phone wirelessly to the car stereo without having to manually set up the devices. In contrast, with the three-way OOB pairing system in this embodiment, the wireless headset 500 is not necessarily designed to connect to the phone in a wired fashion and cannot be connected simultaneously with the game controller 10. The game controller 10 takes advantage of an existing Bluetooth capability of the wireless headset 500, which is likely already paired with the mobile phone 200 to perform the exchange instead.

To achieve seamless pairing between the game controller 10 and the wireless headset 500, the wireless headset 500 can be pre-paired with its corresponding dongle 510. Then, the user can manually pair, via Bluetooth, the mobile phone 200 and the wireless headset 500. Next, the user attaches the game controller 10 to the mobile phone 200 and launches the game controller app on the mobile phone 200. The game controller app recognizes an unpaired proprietary wireless audio solution and starts the OOB pairing process. The game controller app can locate the wireless headset 500 on Bluetooth and establish a data connection, read out proprietary wireless audio solution pairing information from the game controller 10, and exchange the information with the wireless headset 500 via Bluetooth. The game controller app then takes the received pairing information and sends it back to game controller 10, which, in turn, writes to a pairing table in the game controller 10 and restarts the MAC. The wireless headset 500 also saves the received pairing information and restarts its MAC. With the pairing information configured on both sides, the proprietary wireless audio solution can automatically connect to pair the game controller 10 to the wireless headset 500. Any time the proprietary wireless audio solution is connected, the audio endpoints can be enabled on the game controller 10 to route audio from the mobile phone's speaker to USB/Lightning, which will route internally to/from the wireless module. Game controller 10 essentially relays the digital audio to the wireless module.

Figure 10:
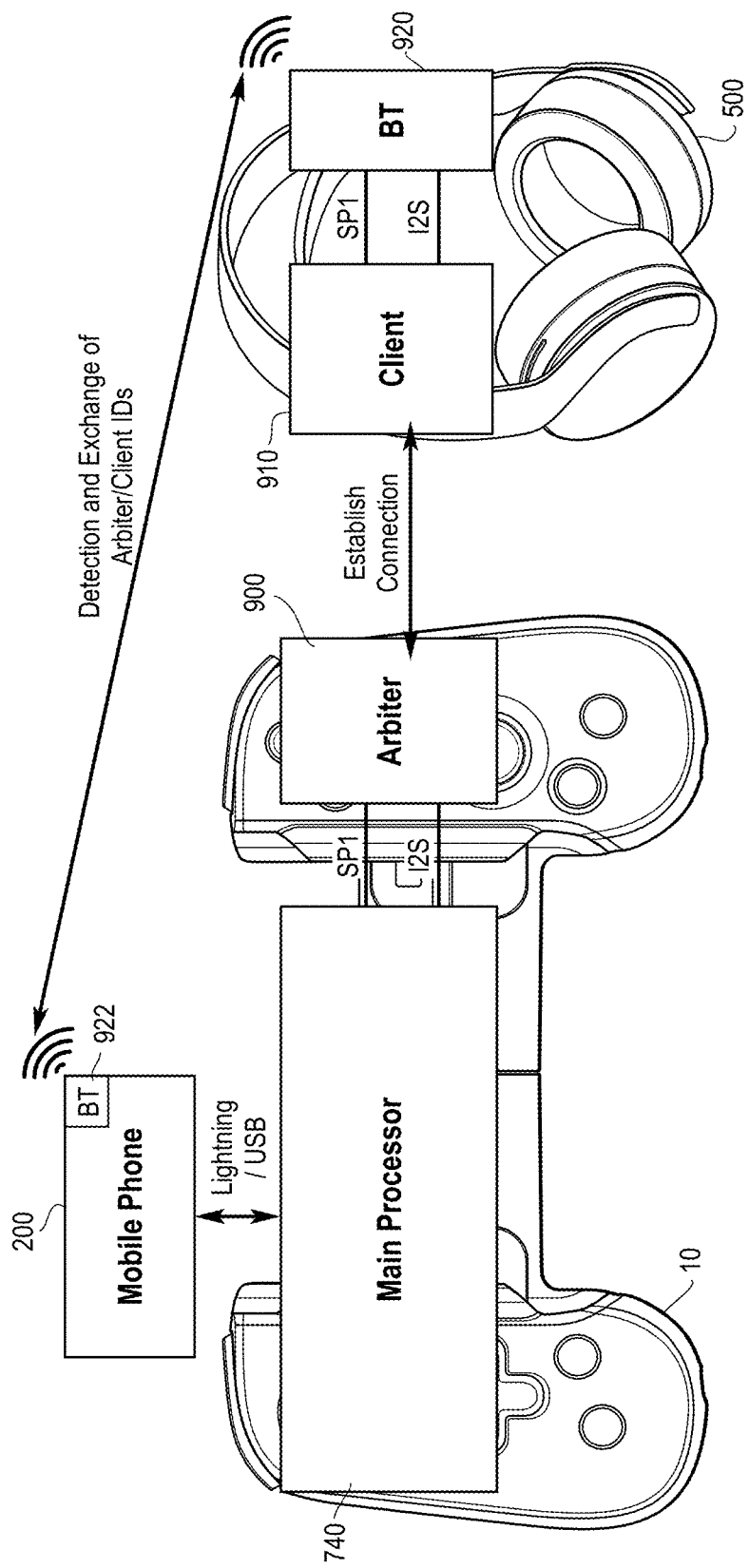
FIG. 10 is an illustration of an example wireless environment of an embodiment.

FIG. 10 is an illustration of another example implementation. In this example, game controller 10 comprises a proprietary wireless audio solution arbiter module 900 that is connected with the main processor 740 of the game controller 10 and is in wireless communication with a proprietary wireless audio solution client 910 in the wireless headset 500. The wireless headset 500 also comprises a Bluetooth module 920 that wirelessly communicates with a Bluetooth module 922 in the mobile phone 200 for detection and exchange of arbiter/client IDs. In this embodiment, the game controller app running in the mobile phone 200 detects that a compatible headset is connected via Bluetooth. Arbiter/client IDs are collected from the proprietary wireless audio solution chips 900, 910, and ID information is exchanged. After the proprietary wireless audio solution connection is established, the audio is re-routed.

Several different link management techniques can be used. For example, a button on the game controller 10 can be used to initiate pairing on the dongle 510 and the wireless headset 500 (e.g., instead of the game controller app initiating the pairing, that function can be mapped to a button on the game controller 10). Also, both the transmitter and receiver can have their own pairing lists. That way, the receiver can walk through its recent transmitters in priority order, which allows for the dongle 510 and the game controller 10 to save their pairings, and the user can swap between transmitters without having to pair them again. Further, pairing information can be synchronized with the cloud and/or exchanged across apps (e.g., the Remote Play app can get information from the game console to facilitate OOB pairing). Additionally, on the transceiver side, the radio can be searching all the time, while, on the receiver side, the radio can be searching when there is no connection. Regarding hand off/OOB pairing, a node ID can be injected into a pairing table, and an encryption key can be programmed as well.

Several different audio management techniques can be used. For example, for USB audio, USB audio class 2.0 can be used for the dynamic audio connector. When the wireless headset 500 is connected, USB endpoints can be activated, which allows audio to flow from the mobile phone 200 to the wireless headset 500. Audio from the wired headset connector can be optionally mixed in, or only one audio source can be active at a time. Wired and wireless audio options do, however, route through the same USB audio flow if both are implemented. Also, USB audio volume messages can be optionally forwarded to the wireless headset 500 over the air (OTA), and vice versa, to implement a single system volume control. For I2Ss audio, bi-directional audio can be exchanged digitally between the main audio processor and the wireless module via I2S. Since the game controller 10 is the transmitter, it can be the I2S master role and disable the I2S signaling anytime audio is not active.

Several different power management techniques can be used, including, but not limited to, smart searching (power on at specific time), pairing/search timeout, and phone USB/Lightning bus) sleep. Also, several different app management (API) techniques can be used, including, but not limited to, power and link control, get link state, get connection stats, remote headset access, end-to-end volume (headset controls phone volume remotely), and OTA firmware upgrade.

In another alternative, the wireless radio can support proximity detection of unpaired radios that share the same protocol. If the wireless headset 500 uses multiple radios, such as a secondary Bluetooth connection, the Bluetooth radio (assuming dual mode BLE) can help advertise the wireless audio capability to the phone. In another alternate embodiment, BLE audio is used, and the game controller 10 can use the mobile phone's radio instead. The game controller app can facilitate pairing as well as provide headset controls through a custom BLE service.

V. Conclusion

Described herein is a game controller and a variety of mechanisms for which game platforms, such PlayStation, Xbox, and others can have a dedicated button for their platforms on such first party or third-party game controllers. A dedicated game platform button may be programmed to launch the game platform's app, service, and/or a specific function within their service. Such a dedicated button may also enable access to a function or feature of the game platform with the game controller app. Additionally, described herein are a variety of mechanisms for which a game controller can more seamlessly pair through a proprietary protocol to headphones, wearables, or other accessories.

Any embodiment, implementation, feature, and/or example described herein is not necessarily to be construed as preferred or advantageous over any other embodiment, implementation, feature, and/or example unless stated as such. Thus, other embodiments, implementations, features, and/or examples may be utilized, and other changes may be made without departing from the scope of the subject matter presented herein. Accordingly, the details described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

Also, when reference is made in this application to two or more defined steps or operations, such steps or operations can be carried out in any order or simultaneously, unless the context excludes those possibilities. Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components. Additionally, directions such as "right" and "left" (or "top," "bottom," etc.) are used for convenience and in reference to the views provided in figures. But the game controller may have a number of orientations in actual use. Thus, a feature that is vertical, horizontal, to the right, or to the left in the figures may not have that same orientation or direction in actual use.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A mobile game controller comprising:
   one or more processors;
   a non-transitory computer-readable medium; and
   program instructions stored on the non-transitory computer-readable medium that, when executed by the one or more processors, cause the one or more processors to perform functions comprising:
      receiving, from a computing device connected with the mobile game controller, first pairing information, wherein the computing device is configured to receive the first pairing information from a wireless audio device over a first wireless communication channel established between the computing device and the wireless audio device, and wherein the first pairing information is for wirelessly connecting to the wireless audio device over a second wireless communication channel that is different from the first wireless communication channel;
      sending, to the computing device, second pairing information, wherein the computing device is configured to send the second pairing information to the wireless audio device over the first wireless communication channel, and wherein the second pairing information is for wirelessly connecting to the mobile game controller over the second wireless communication channel; and
      establishing a wireless connection to the wireless audio device over the second wireless communication channel, wherein the wireless connection is established using the first and second pairing information exchanged between the mobile game controller and the wireless audio device by the computing device over the first wireless communication channel.

2. The mobile game controller of claim 1, wherein the first wireless communication channel comprises Bluetooth and the second wireless communication channel comprises a proprietary wireless audio solution.

3. The mobile game controller of claim 2, further comprising a proprietary wireless audio solution arbiter configured to wirelessly communicate with a proprietary wireless audio solution client in the wireless audio device.

4. The mobile game controller of claim 1, wherein the first pairing information is received from the computing device over a wired connection.

5. The mobile game controller of claim 1, wherein the first pairing information is received from the computing device over a wireless connection.

6. The mobile game controller of claim 1, wherein at least one of the first and second pairing information comprises an arbiter and/or client identifier.

7. The mobile game controller of claim 1, wherein the program instructions, when executed by the one or more processors, further cause the one or more processors to perform functions comprising:
routing audio from the computing device to the wireless audio device via the second communication channel.

8. The mobile game controller of claim 1, wherein the mobile game controller is a platform-specific mobile game controller, and wherein the wireless audio device is associated with the platform.

9. The mobile game controller of claim 1, wherein the wireless audio device is configured to wirelessly connect to a dongle over the second wireless communication channel, and wherein the dongle is configured to connect to a game console over a wired connection.

10. The mobile game controller of claim 1, wherein the wireless audio device comprises a headset.

11. The mobile game controller of claim 1, further comprising a connector for a wired audio device.

12. A method comprising:
performing in a mobile game controller connected with a computing device, wherein the computing device is wirelessly connected with a wireless audio device over Bluetooth:
establishing a wirelessly connection to the wireless audio device over a proprietary wireless audio solution, wherein the wireless connection is established using pairing information exchanged between the mobile game controller and the wireless audio device via the computing device over Bluetooth; and
routing audio received from the computing device to the wireless audio device over the proprietary wireless audio solution.

13. The method of claim 12, wherein the wireless connection is established using three-way out-of-band pairing.

14. The method of claim 13, wherein the three-way out-of-band pairing involves the wireless audio device, the mobile game controller, and a dongle configured to connect to a game console.

15. The method of claim 12, wherein the pairing information comprises an arbiter and/or client identifier.

16. The method of claim 12, further comprising performing an audio management operation.

17. The method of claim 12, further comprising performing a power management operation.

18. A non-transitory computer-readable medium storing program instructions that, when executed by one or more processors of a mobile game controller connected with a computing device that is wirelessly connected with a wireless audio device over a first wireless communication channel, cause the one or more processors to perform functions comprising:
establishing a wirelessly connection to the wireless audio device over a second wireless communication channel different from the first wireless communication channel, wherein the wireless connection is established using pairing information exchanged between the mobile game controller and the wireless audio device via the computing device over the first wireless communication channel; and
routing audio received from the computing device to the wireless audio device over the second wireless communication channel.

19. The non-transitory computer-readable medium of claim 18, wherein the first wireless communication channel comprises Bluetooth and the second wireless communication channel comprises a proprietary wireless audio solution.

20. The non-transitory computer-readable medium of claim 18, wherein the pairing information is exchanged using three-way out-of-band pairing.

* * * * *